(12) United States Patent
Kondo et al.

(10) Patent No.: US 8,402,949 B2
(45) Date of Patent: Mar. 26, 2013

(54) FUEL INJECTOR WITH FUEL PRESSURE SENSOR

(75) Inventors: Jun Kondo, Nagoya (JP); Tooru Taguchi, Handa (JP); Hideo Naruse, Chiryu (JP); Fumiaki Arikawa, Okazaki (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 596 days.

(21) Appl. No.: 12/265,743

(22) Filed: Nov. 6, 2008

(65) Prior Publication Data
US 2009/0118981 A1    May 7, 2009

(30) Foreign Application Priority Data
Nov. 6, 2007  (JP) .................................. 2007-289074

(51) Int. Cl.
*F02M 51/00*    (2006.01)
(52) U.S. Cl. ........................ 123/490; 123/494; 239/583
(58) Field of Classification Search ................. 123/490, 123/494, 468; 239/583, 584
See application file for complete search history.

(56) References Cited

U.S. PATENT DOCUMENTS

| | | | | |
|---|---|---|---|---|
| 3,883,715 A * | 5/1975 | Gebo ............................. | 219/210 |
| 4,438,496 A | 3/1984 | Ohie | |
| 4,775,816 A | 10/1988 | White et al. | |
| 4,858,073 A * | 8/1989 | Gregory ......................... | 361/708 |
| 5,700,526 A * | 12/1997 | Ximen et al. .................. | 427/527 |
| 5,712,422 A * | 1/1998 | Kato .............................. | 73/23.32 |
| 5,780,173 A * | 7/1998 | Harrington et al. ............ | 428/661 |
| 5,789,673 A * | 8/1998 | Igarashi et al. ............... | 73/202.5 |
| 5,918,275 A * | 6/1999 | Kato et al. .................... | 73/114.73 |
| 6,575,039 B2 * | 6/2003 | Murai et al. .................... | 73/756 |
| 6,629,521 B1 * | 10/2003 | Kato .............................. | 123/687 |
| 6,960,779 B2 * | 11/2005 | Shields et al. .................. | 257/13 |
| 7,337,768 B2 * | 3/2008 | Elia et al. ....................... | 123/549 |
| 7,481,205 B2 * | 1/2009 | Keeler et al. ................... | 123/549 |
| 7,770,520 B2 * | 8/2010 | Fink et al. ................ | 102/202.12 |
| 2001/0008090 A1 * | 7/2001 | Murai et al. .................... | 73/756 |
| 2002/0023486 A1 * | 2/2002 | Watanabe et al. ............ | 73/202.5 |
| 2003/0111049 A1 | 6/2003 | Lewis et al. | |
| 2003/0218143 A1 * | 11/2003 | Shields et al. ............. | 250/493.1 |

(Continued)

FOREIGN PATENT DOCUMENTS

| | | |
|---|---|---|
| DE | 199 45 673 | 4/2001 |
| DE | 103 36 816 | 3/2005 |

(Continued)

OTHER PUBLICATIONS

Chinese Office Action dated Aug. 23, 2010, issued in corresponding Chinese Application No. 200810170452.9 with English translation.

(Continued)

*Primary Examiner* — John Kwon
(74) *Attorney, Agent, or Firm* — Nixon & Vanderhye P.C.

(57) ABSTRACT

A fuel injector for an internal combustion engine is provided. The fuel injector is equipped with a fuel pressure sensor which is installed in a metallic injector body. The fuel injector also includes an amplifier working to amplify an output of the fuel pressure sensor and a thermal insulating member disposed between the metallic injector body and the amplifier to shield the amplifier thermally, thereby ensuring the accuracy in measuring the pressure of fuel within the fuel injector.

4 Claims, 3 Drawing Sheets

U.S. PATENT DOCUMENTS

| | | | |
|---|---|---|---|
| 2004/0025585 A1* | 2/2004 | Seki et al. | 73/204.26 |
| 2004/0060354 A1* | 4/2004 | Watanabe et al. | 73/204.22 |
| 2006/0170909 A1 | 8/2006 | Wlodarczyk et al. | |
| 2006/0257664 A1* | 11/2006 | Hwang et al. | 428/408 |
| 2007/0106172 A1* | 5/2007 | Abreu | 600/549 |
| 2008/0228374 A1 | 9/2008 | Ishizuka et al. | |
| 2008/0278879 A1* | 11/2008 | Taillet | 361/213 |
| 2009/0038589 A1* | 2/2009 | Dingle | 123/480 |

FOREIGN PATENT DOCUMENTS

| | | |
|---|---|---|
| DE | 10 2005 024 194 | 11/2006 |
| EP | 0 316 257 | 5/1989 |
| EP | 1 118 849 | 7/2001 |
| EP | 1 321 660 | 6/2003 |
| GB | 2 019 581 | 10/1979 |
| JP | 57-005526 | 1/1982 |
| JP | S62-007969 | 1/1987 |
| JP | 2000-265892 | 9/2000 |
| JP | 2000-275128 | 10/2000 |
| JP | 2001-512564 | 8/2001 |
| JP | 2001-272292 | 10/2001 |
| JP | 2008-144749 | 6/2008 |

OTHER PUBLICATIONS

Japanese Office Action dated Aug. 16, 2011, issued in corresponding Japanese Application No. 2007-289074 with English translation.

European Extended Search Report dated Mar. 31, 2009, issued in corresponding European Application No. 08168397.1-2311.

* cited by examiner

FUEL INJECTOR WITH FUEL PRESSURE SENSOR

CROSS REFERENCE TO RELATED DOCUMENT

The present application claims the benefit of Japanese Patent Application No. 2007-289074 filed on Nov. 6, 2007, the disclosure of which is incorporated herein by reference.

BACKGROUND OF THE INVENTION

1. Technical Field of the Invention

The present invention relates generally to a fuel injector to be installed in an internal combustion engine to spray fuel thereinto, and more particularly to such a fuel injector which has installed therein a fuel pressure sensor working to measure a change in pressure of fuel arising from the spraying of the fuel into the engine accurately.

2. Background Art

In order to ensure the accuracy in controlling output torque of internal combustion engines and the quantity of exhaust emissions therefrom, it is essential to control a fuel injection mode such as the quantity of fuel to be sprayed from a fuel injector or the injection timing at which the fuel injector starts to spray the fuel. For controlling such a fuel injection mode, there have been proposed techniques for monitoring a change in pressure of the fuel upon spraying thereof from the fuel injector.

Specifically, the time when the pressure of the fuel begins to drop due to the spraying thereof from the fuel injector may be used to determine an actual injection timing at which the fuel has been sprayed actually. The amount of drop in pressure of the fuel arising from the spraying thereof may be used to determine the quantity of fuel actually sprayed from the fuel injector. Such actual observation of the fuel injection mode ensures the desired accuracy in controlling the fuel injection mode.

For instance, in the case where a change in pressure of the fuel arising from the spraying of the fuel from the fuel injector (which will also be referred to as a fuel pressure change below) is measured using a pressure sensor installed directly in a common rail (i.e., a fuel accumulator), it will be somewhat absorbed within the common rail, thus resulting in a decrease in accuracy in determining such a pressure change. In order to alleviate this drawback, Japanese Patent First Publication No. 2000-265892 teaches installation of the pressure sensor in a joint between the common rail and a high-pressure pipe through which the fuel is delivered from the common rail to the fuel injector to measure the fuel pressure change before it is absorbed within the common rail.

The fuel pressure change, as produced at a spray hole of the fuel injector through which the fuel has been sprayed, will, however, surely attenuate within the high-pressure pipe. The use of the pressure sensor installed in the joint between the common rail and the high-pressure pipe, therefore, does not ensure the desired accuracy in determining the fuel pressure change. The inventors have study the installation of the pressure sensor in a portion of the fuel injector which is located downstream of the high-pressure pipe. Such installation, however, has been found to pose the problems, as discussed below.

The pressure sensor is typically made up of a sensing device and an electric circuit. The sensing device is usually designed to be sensitive to the distortion (i.e., elastic deformation) of an elastic member deformable as a function of the pressure of the fuel exerted thereon and output an electric signal indicative thereof. The electric circuit works as an amplifier to amplify the signal outputted by the sensing device. The fuel injector typically has formed therein a high-pressure path through which the fuel is to be delivered to the spray hole under high pressures and a metallic body within which an open/close mechanism working to open or close the spray hole is installed.

In use, the fuel injector is disposed near a combustion chamber of the engine, so that the metallic body will be subjected to high temperatures. Particularly, in diesel engines or direct injection gasoline engines in which the body of the fuel injector is installed in the cylinder head, the temperature of the body will be elevated up to as high as 140° C. This causes the electric circuit disposed in the body of the fuel injector to damage thermally, so that the performance and reliability in operation thereof will decrease. Specifically, the thermally damage results in a change in amplification of the output from the sensing device in the electric circuit.

SUMMARY OF THE INVENTION

It is therefore a principal object of the invention to avoid the disadvantages of the prior art.

It is another object of the invention to provide a fuel injector for an internal combustion engine which may be employed in automotive diesel common rail injection system and which is equipped with a fuel pressure sensors a circuit component, a thermal shield to shield the circuit component thermally.

According to one aspect of the invention, there is provided a fuel injector for an internal combustion engine such as an automotive diesel engines. The fuel injector comprises: (a) a metallic body in which a fuel flow path is formed which extends from a fuel inlet to a spray hole; (b) an actuator disposed within the metallic body, the actuator working to open the spray hole to spray fuel, as supplied to the fuel flow path through the fuel inlet, to an internal combustion engine; (c) a fuel pressure sensor installed in the metallic body, the fuel pressure sensor working to measure a pressure of the fuel in the fuel flow path and produce an electric signal indicative thereof; (d) a circuit component serving as an amplifier to amplify the electric signal, as produced by the fuel pressure sensor to output the electric signal; and (e) a thermal insulating member disposed between the metallic body and the circuit component to shield the circuit component thermally.

Specifically, the thermal insulating member works as a thermal shield to shield the circuit component from the heat transferred from the metallic body, thus ensuring the accuracy of an output from the circuit component indicating the pressure of the fuel in the fuel flow path.

In the preferred mode of the invention, the fuel pressure sensor includes a metallic deformable member and a sensing device. The metallic deformable member is secured to the metallic body to deform elastically when subjected to the pressure of the fuel. The sensing device is mounted on the metallic deformable member to produce the electric signal as a function of an amount of deformation of the metallic deformable member. The thermal insulating member is disposed between the deformable member and the circuit component.

The deformable member is metallic, so that it elevates in temperature thereof, like the metallic body, when subjected to the heat, as produced by the engine. In order to minimize the transfer of the heat to the circuit component through the deformable member for ensuring the stability of operation of the fuel pressure sensors the thermal insulating member is disposed between the deformable member and the circuit component.

The thermal insulating member has formed therein a through hole extending from one of opposed surfaces thereof which faces the metallic body to the other of the opposed surfaces on which the circuit component is mounted. The metallic deformable member is disposed inside the through hole. The circuit component is fabricated on an insulating substrate. The thermal insulating member has formed on the other of the opposed surfaces a mount area on which the sensing device of the fuel pressure sensor is mounted and which lies flush with the insulating substrate. This improves the efficiency of work to joining the sensing device to the circuit component.

The thermal insulating member has the circuit component mounted thereon and also has retained therein connector terminals leading electrically to the circuit component. The thermal insulating member, the connector terminals, and the circuit component are united as an assembly. The thermal insulating member also serves as a holder to hold the circuit component and the connector terminal, thus resulting in a decrease in total number of parts of the fuel injector.

The thermal insulating member is made of one of resin, rubber, and ceramic.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
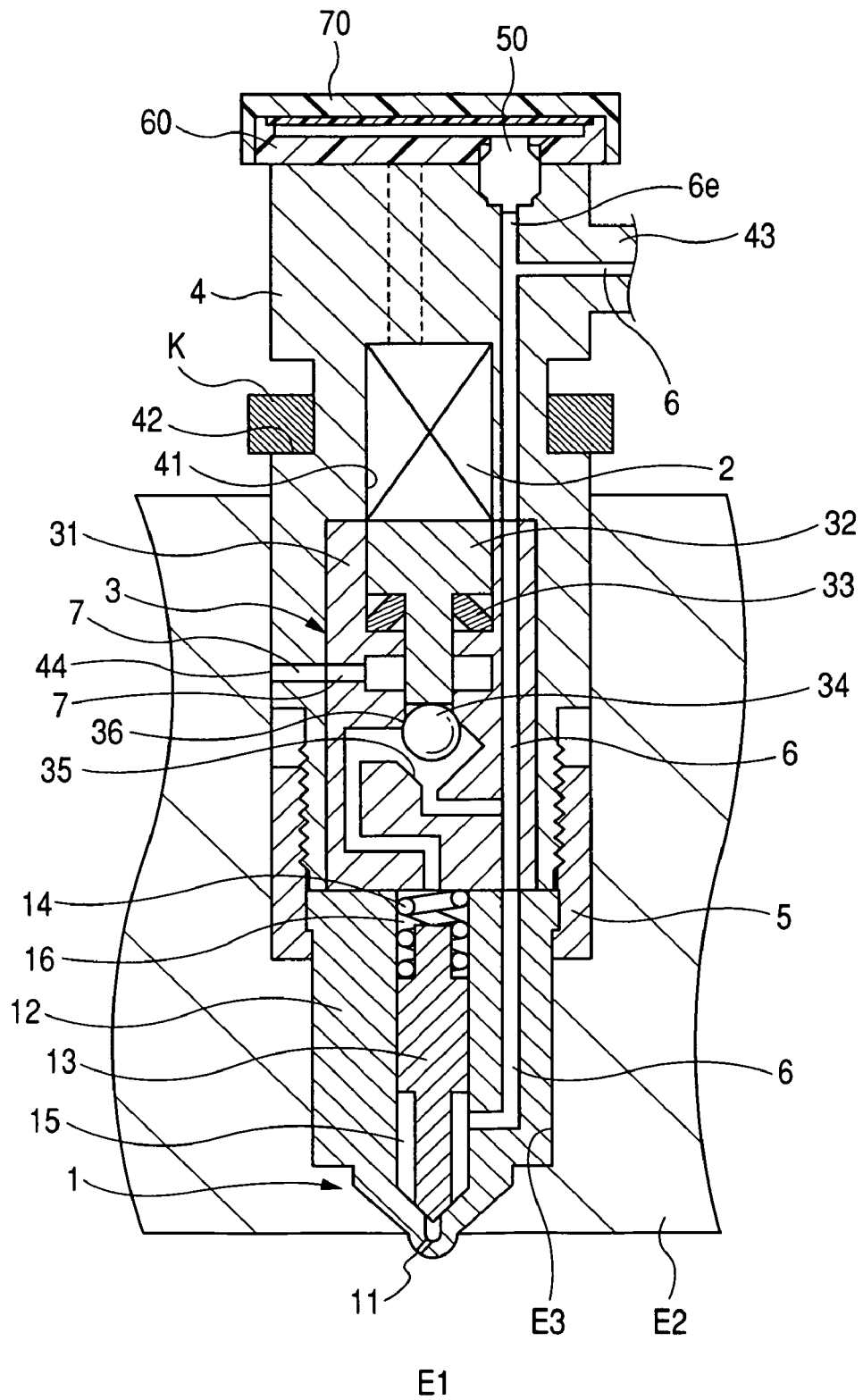
FIG. 1 is a longitudinal sectional view which shows an internal structure of a fuel injector according to the first embodiment of the invention.
Figure 2:
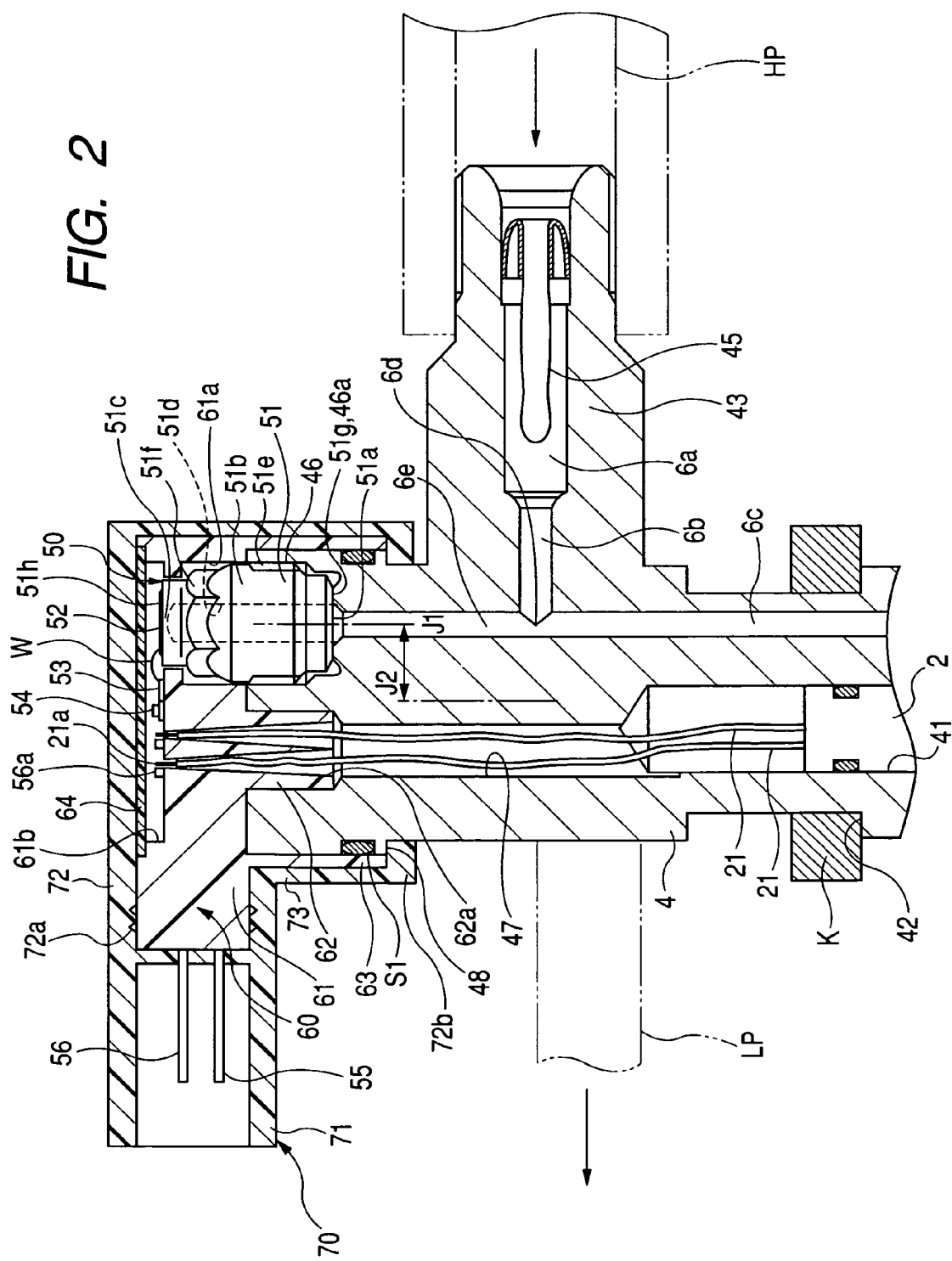
FIG. 2 is a partially enlarged sectional view of FIG. 1.

Referring to the drawings, wherein like reference numbers refer to like parts in several views, particularly to FIGS. 1 and 2, there is shown a fuel injector according to the first embodiment of the invention which will be referred to herein as being used in, for example, automotive common rail fuel injection systems for diesel engines.

The fuel injector works to inject the fuel, as stored in a common rail (not shown) at controlled high pressures, into a combustion chamber E1 in a cylinder of an internal combustion diesel engine. The fuel injector is equipped with a nozzle 1 from which the fuel is sprayed, a piezoelectric actuator 2 which serves as an open/close mechanism and expands when electrically charged and contracts when discharged, and a back-pressure control mechanism 3 which is operated by the piezoelectric actuator 2 to control the back pressure acting on the nozzle 1.

The nozzle 1 is made up of a nozzle body 12 in which a spray hole(s) 11 is formed, a needle 13 which is moved into or out of abutment with an inner seat of the nozzle body 12 to close or open the spray hole 11, and a spring 14 urging the needle 13 in a valve-closing direction to close the spray hole 11.

The piezoelectric actuator 2 includes a piezo stack made up of a plurality of piezoelectric devices. The piezoelectric actuator 2 is a capacitive load which expands when electrically charged and contracts when discharged and functions as an actuator to move the needle 13.

The back-pressure control mechanism 3 includes a valve body 31 within which a piston 32, a disc spring 33, and a ball valve 34 are disposed. The piston 32 is moved following the stroke of the piezoelectric actuator 2. The disc spring 33 urges the piston 32 into constant abutment with the piezoelectric actuator 2. The ball valve 34 is moved by the piston 32. The valve body 31 is illustrated as being made by a one-piece member, but is actually formed by a plurality of blocks.

The fuel injector also includes a cylindrical injector body 4 in which a cylindrical mount chamber 41 is formed which extends along a longitudinal center line of the fuel injector. The mount chamber 41 has an inner shoulder to define a small-diameter housing (i.e., an upper housing, as viewed in FIG. 1) in which the piezoelectric actuator 2 is mounted and a large-diameter housing (i.e., a lower housing, as viewed in FIG. 1) in which the back-pressure control mechanism 3 is mounted. A hollow cylindrical retainer 5 is fit in the injector body 4 in a screw fashion to retain the nozzle 1 within the head of the injector body 4.

The nozzle body 12, the injector body 4, and the valve body 31 have formed therein a high-pressure path 6 through which the fuel is delivered at a controlled high pressure from the common rail to the spray hole 11. The injector body 4 and the valve body 31 have also formed therein a low-pressure path 7 which connects with a fuel tank (not shown). The nozzle body 12, the injector body 4, and the valve body 31 are made of metallic material and to be fit in a mount hole E3 formed in a cylinder head E2 of the engine. The injector body 4 has an outer shoulder 42 with which an end of a clamp K is to engage for securing the fuel injector in the mount hole E3 tightly Specifically, installation of the fuel injector in the mount hole E3 is achieved by fastening the other end of the clamp K to the cylinder head E2 through a bolt to press the outer shoulder 42 into the mount hole E3.

Between the outer periphery of a top portion of the needle 13 close to the spray hole 11 and the inner periphery of the nozzle body 12, a high-pressure chamber 15 is formed which establishes a fluid communication between the high-pressure path 6 and the spray hole 11 when the needle 13 is lifted up in a valve-opening direction. The high-pressure chamber 15 is supplied with the high-pressure fuel through the high-pressure path 6 at all times. A back-pressure chamber 16 is formed by one of ends of the needle 13 which is opposite the spray hole 11. The spring 14 is disposed within the back-pressure chamber 16 to urge the needle 13 in the valve-closing direction.

The valve body 31 has formed therein a high-pressure seat 35 exposed to a fluid path extending between the high-pressure path 6 and the back-pressure chamber 16. The valve body 31 has also formed therein a low-pressure seat 36 exposed to a path extending between the low-pressure path 7 and the back-pressure chamber 16 in the nozzle 1. The low-pressure seat 36 faces the high-pressure seat 35 to define a valve chamber within which the ball valve 34 is disposed.

The injector body 4 has, as shown in FIGS. 1 and 2, a high-pressure port (i.e., a fuel inlet) 43 to which a high-pressure pipe HP is to be connected and a low-pressure port (i.e., a fuel outlet) 44 to which a low-pressure pipe LP (i.e., a drain pipe) is to be connected. The low-pressure port 44 may be located either below or above the clamp K, in other words, closer to or farther from the spray hole 11 than the clamp K, as illustrated in FIG. 1 or 2. Similarly, the high-pressure port 43 may be located wither below or above the clamp K.

The fuel injector of this embodiment is so designed that the fuel is delivered from the common rail to the high-pressure port 43 through the high-pressure pipe HP, in other words, the fuel enters the cylindrical injector body 4 at an outer circumferential wall thereof. The fuel, as having entered the fuel injector, passes through portions 6a and 6b of the high-pressure path 6 within the high-pressure port 43, as clearly illustrated in FIG. 2, which extend perpendicular to the axis (i.e., the longitudinal direction) of the fuel injector, flows through a portion 6c of the high-pressure path 6 extending parallel to the axis of the fuel injector, and then enters the high-pressure chamber 15 and the back-pressure chamber 16.

The high-pressure paths 6c and 6b that are portions of the high-pressure path 6 intersect with each other at substantially right angles to in the form of an elbow. The high-pressure path 6 also includes a branch path 6e which extends from a joint or intersection 6d between the high-pressure paths 6c and 6b away from the spray hole 11 in parallel to the longitudinal axis of the injector body 4. The branch path 6c leads to a fuel pressure sensor 50, as will be described below in detail.

The high-pressure path 6a is greater in diameter than the high-pressure path 6b within the high-pressure port 43. A filter 45 is, as can be seen in FIG. 2, disposed inside the high-pressure path 6a to trap foreign matters contained in the fuel supplied from the common rail.

When the piezoelectric actuator 2 is in a contracted state, the valve 34 is, as illustrated in FIG. 1, urged into abutment with the low-pressure seat 36 to establish the fluid communication between the back-pressure chamber 16 and the high-pressure path 6, so that the high-pressure fuel is supplied to the back-pressure chamber 16. The pressure of the fuel in the back-pressure chamber 16 and the elastic pressure, as produced by the spring 14 act on the needle 13 to urge it in the valve-closing direction to close the spray hole 11.

Alternatively, when the piezoelectric actuator 2 is in an expanded state, the valve 34 is pushed into abutment with the high-pressure seat 35 to establish the fluid communication between the back-pressure chamber 16 and the low-pressure path 7, so that the pressure in the back-pressure chamber 16 drops, thereby causing the needle 13 to be urged by the pressure of fuel in the high-pressure chamber 15 in the valve-opening direction to open the spray hole 11 to spray the fuel into the combustion chamber E1 of the engine.

The spraying of the fuel from the spray hole 11 will result in a variation in pressure of the fuel in the high-pressure path 6. The fuel pressure sensor 50 installed in the injector body 4 works to measure such a fuel pressure variation. An ECU (electronic control unit) of a fuel injection system (not shown) analyses the waveform of the output from the fuel pressure sensor 50 and finds the time when the pressure of the fuel began to drop due to the spraying of the fuel from the spray hole 11 to determine the injection timing of the fuel injector. The ECU also analyzes the waveform of the output and finds the time when the pressure of the fuel began to rise due to the termination of the spraying of the fuel from the spray hole 11 to calculate the end of the injection duration for which the fuel injector is kept opened. The ECU further calculates the amount of drop in pressure of the fuel to determine the quantity of fuel actually sprayed from the fuel injector.

The structure of the fuel pressure sensor 50 and the installation thereof in the injector body 4 will be described below.

The fuel pressure sensor 50 is equipped with a stem 51 working as a pressure deformable member which is sensitive to the pressure of fuel in the branch path 6e to deform elastically and a strain gauge 52 working to convert the elastic deformation or distortion of the stem 51 into an electric signal. The stem 51 is made of metal which needs to have the mechanical strength great enough to withstand the pressure of the fuel in the branch path 6e and a coefficient of thermal expansion low enough to keep adverse effects on the operation of the strain gauge 52 within an allowable range. For example, the stem 51 is preferably formed by machining (cutting) or cold-forging a material made of a mixture of main components of Fe, Ni, and Co or Fe and Ni and additives of Ti, Nb, and Al or Ti and Nb as precipitation strengthening materials.

The stem 51 includes a hollow cylindrical body 51b, as illustrated in FIG. 2, and a circular plate-made diaphragm 51c. The cylindrical body 51b has formed in an end thereof a fuel inlet 51a into which the fuel enters. The diaphragm 51c closes the other end of the cylindrical body 51b. The pressure of the fuel entering the cylindrical body 51b at the inlet 51a is exerted on the diaphragm 51c and an inner wall a 51d of the cylindrical body 51b, so that the stem 51 is deformed elastically as a whole.

The cylindrical body 51b and the diaphragm 51c are axialsymmetrical with respect to a longitudinal center line J1 (i.e., an axis), as indicated by a dashed-dotted line in FIG. 2, of the fuel pressure sensor 50 (i.e., the stem 51), so that the stem 51 will deform axisymmetrically when subjected to the pressure of the fuel. The longitudinal center line J1 of the stem 51 is offset from the longitudinal center line J2 of the injector body 4 in parallel thereto. In other words, the fuel pressure sensor 50 is placed in misalignment with the injector body 4 in the longitudinal direction of the fuel injector.

The injector body 4 has formed in the end (i.e., an upper end, as viewed in FIG. 2) thereof a recess or mount chamber 46 in which the cylindrical body 51b of the stem 51 is mounted. The mount chamber 46 has an internal thread formed on an inner peripheral wall thereof. The cylindrical body 51b has an external thread 51e formed on an outer peripheral wall thereof. The installation of the stem 51 in the injector body 4 is achieved by inserting the stem 51 into the mount chamber 46 from outside the injector body 4 along the longitudinal center line J2 and fastening a chamfered surface 51f formed on the outer periphery of the cylindrical body 51b using a tool such as a spanner to engage the external thread 51e of the cylindrical body 51b with the internal thread of the mount chamber 46.

The bottom of the mount chamber 46 of the injector body 4 has an annular seating surface 46a extending around the circumference of the open end of the inlet 51a. Similarly, the cylindrical body 51b of the stem 51 has formed on the top end (i.e., the lower end, as viewed in FIG. 2) thereof facing the spray hole 11 an annular sealing surface 51g which is to be placed in close abutment with the sealing surface 46a when the fuel pressure sensor 50 is fastened in the mount chamber 46 tightly. Specifically, the tight engagement of the external thread 51e of the cylindrical body 51b with the internal thread of the mount chamber 46 urges the sealing surface 51g of the cylindrical body 51b into constant abutment with the sealing surface 46a of the mount chamber 46 to create a hermetical metal-touch-seal between the injector body 4 and the stem 51. This avoids the leakage of the fuel from the branch path 6e to outside the injector body 4 through a contact between the injector body 4 and the stem 51. Each of the sealing surfaces 46a and 51g extends perpendicular to the longitudinal center line J1 of the stem 51.

The strain gauge 52 is affixed to a mount surface 51h of the diaphragm 51c through an insulating film (not shown). The mount surface 51h is one of opposed outer major surfaces of the diaphragm 51c which is far from the inlet 51a. When the pressure of the fuel enters the cylindrical body 51b, so that the stem 51 elastically expands, the diaphragm 51c will deform.

This causes the strain gauge 52 to produce an electrical output as a function of the amount of deformation of the diaphragm 51c. The diaphragm 51c and a portion of the cylindrical body 51b are located outside the mount chamber 46. The diaphragm 51c is disposed on the cylindrical body 51b so as to extend perpendicular to the longitudinal center line J1 of the stem 51.

An insulating substrate 53 is placed flush with the mount surface 51h. On the insulating substrate 53, circuit component parts 54 are fabricated which constitute a voltage applying circuit and an amplifier which are electrically connected to the strain gauge 52 through wires W using wire bonding techniques. The strain gauge 52 forms a bridge circuit along with resistors (not shown). The voltage applying circuit works to apply the voltage to the strain gauge 52. This causes the bridge circuit to change a resistance value thereof as a function of the degree of deformation of the diaphragm 51c, thus resulting in a change in output voltage from the bridge circuit. Specifically, the bridge circuit produces the voltage as indicating the pressure of the fuel in the branch path 6e. The amplifier works to amplify the output from the strain gauge 52 (i.e., the voltage produced by the bridge circuit) and outputs it from one of four sensor terminals 55: one being a sensor output terminal, one being a voltage terminal, one being a circuit control terminal, and one being a ground terminal. Drive terminals 56 extend parallel to the sensor terminal s55 in connection with positive and negative power supply leads 21 extending from the piezoelectric actuator 2. The drive terminals 56 serve to supply electric power (e.g., 160 to 170V) to the piezoelectric actuator 2 to charge it.

The sensor terminals 55 and the drive terminals 56 are united by a mold 60 made of resin (i.e., heat insulator material). The resin mold 60 is made up of a body 61, a boss 62, and a hollow cylindrical wall 63. The body 61 is placed on one of the ends of the cylindrical injector body 4 which is far from the spray hole 11. The boss 62 extends or projects downwardly, as viewed in FIG. 2, from the body 61 toward the spray hole 11. The cylindrical wall 62 extends from the body 61 toward the spray hole 11 around the boss 62.

The body 61 has formed therein a hole 61a within which the fuel pressure sensor 50 is disposed. The mount surface 51h of the diaphragm 51c on which the strain gauge 52 is secured is exposed to an open end of the hole 61a far from the spray hole 11. The insulating substrate 53 is affixed to one of opposed surfaces of the body 61 which is far from the spray hole 11, so that the mount surface 51h of the diaphragm 51c lies in the same plane as the insulating substrate 53. The strain gauge 52 on the mount surface 51h, the circuit component parts 54, and the insulating substrate 53 are disposed within a mount recess 61b formed in the surface of the body 61. The mount recess 61b is closed by a resinous cover 64.

The boss 62 of the resin mold 60 is fitted in a lead wire hole 47 which is formed in the injector body 4 and through which the power supply leads 21 pass, thereby positioning the resin mold 60 radially of the injector body 4. The boss 62 has formed therein a through hole 62a which extends substantially parallel to the longitudinal center line J2. Ends of the lead wires 21 and ends 56a of the drive terminals 56 are exposed outside the surface of the body 61 which is far from the spray hole 11. Each of the lead wires 21 is welded electrically to one of the ends 56a of the drive terminals 56.

The hollow cylindrical wall 63 extends along the outer periphery of the injector body 4. Specifically, the cylindrical wall 63 is fit on the circumference of the injector body 4. An O-ring S1 is fit in an annular groove formed in the circumference of the injector body 4 to establish a hermetical seal between the injector body 4 and the cylindrical wall 63, which avoids the intrusion of water from outside the injector body 4 to the strain gauge 52 and the lead wires 21 through a contact between the injector body 4 and the resin mold 60. When adhered to the lead wires 21, drops of water may flow along the lead wires 21 to wet the drive terminals 56 and the circuit component parts 54 undesirably.

The sensor terminals 55 and the drive terminals 56 disposed within the resin mold 60 are retained firmly inside a resinous connector housing 70. Specifically, the sensor terminals 55, the drive terminals 56, and the connector housing 70 constitute a sensor electric connector assembly. The connector housing 70 includes a hollow cylindrical extension 71 for establishing a mechanical connection with external lead wires (not shown), a hollow body 72 in which the resin mold 60 is retained, and a hollow cylindrical wall 73 which extends toward the spray hole 11 and is fit on the cylindrical wall 63 of the resin mold 60.

The body 72 and the cylindrical wall 73 are contoured as a whole to conform with the contours of the body 61, the cover 64, and the cylindrical wall 63 of the resin mold 60. The connector housing 70 and the resin mold 60 are assembled together using molding techniques. Specifically, the body 72 has annular ridges 72a which create hermetical seals between the connector housing 70 and the resin mold 60 when the connector housing 70 is molded so as to cover the resin mold 60, as will be described later in detail. The hermetical seals avoid the intrusion of water from outside the injector body 4 into the connector housing 70 through a contact between the inner wall of the cylindrical wall 73 of the connector housing 70 and the outer wall of the cylindrical wall 73 of the resin mold 60 to wet the sensor terminals 53 and the drive terminals 56 exposed inside the cylindrical extension 71 undesirably.

The cylindrical wall 73 of the connector housing 70 has an annular claw 72b which establishes a snap fit on a shoulder 48 formed on the injector body 4, thereby securing the orientation of an assembly of the connector housing 70 and the resin mold 60 to the longitudinal center line J1 of the stem 50.

A sequence of steps of installing the fuel pressure sensor 50 and the connector housing 70 in and on the injector body 4 will be described below.

First, the piezoelectric actuator 2 and the fuel pressure sensor 50 are installed in the mount chambers 41 and 46 of the injector body 4, respectively. The installation of the fuel pressure sensor 50 is, as already described above, achieved by inserting the fuel pressure sensor 50 into the mount chamber 46 parallel to the longitudinal center line J2 of the injector body 4, and turning the chamfered surface 51f using the clamp K to press the sealing surface 51g of the stem 51 against the sealing surface 46a of the mount chamber 46 of the injector body 4 to establish the metal-touch-seal between the injector body 4 and the stem 51. The sensor terminals 55 and the drive terminals 56 which are united by the resin mold 60 is prepared. The insulating substrate 53 on which the circuit component parts 54 are fabricated is mounted on the resin mold 60.

Next, the resin mold 60 in and on which the sensor output terminal 55, the drive terminals 56, and the insulating substrate 53 are mounted is fitted in the injector body 4 in which the piezoelectric actuator 2 and the fuel pressure sensor 50 are already installed. Specifically, the boss 60 of the resin mold 60 is fitted into the lead wire hole 47. Simultaneously, the lead wires 21 are inserted into the through hole 62a, and the fuel pressure sensor 50 is fitted into the hole 61a of the body 61 of the resin mold 60, so that the mount surface 51h of the diaphragm 51c lies flush with the insulating substrate 53.

Subsequently, the strain gauge 52 placed on the mount surface 51h is joined electrically to lands on the insulating substrate 53 through the wires W using the wire bonding techniques. Each of the ends 21a of the lead wires 21 exposed inside the mount recess 61b is welded to one of the ends 56a of the drive terminals 56.

The cover 54 is welded or glued to the resin mold 60 to cover the mount recess 61b hermetically. Finally, the connector housing 70 is formed by resin as to cover the resin mold 60. Specifically, resin is thermally melted over the resin mold 60 to mold the connector housing 70 so that the annular claw 72b is fit on the shoulder 48 of the injector body 48. During such a molding process, the annular ridges 72a formed on the resin mold 60 melt to create the hermetical seals between the connector housing 70 and the resin mold 60. This completes the installation of the fuel pressure sensor 50 and the connector housing 70 in and on the injector body 4.

In the complete assembly of the fuel injector, the resin mold 60 is located between the injector body 4 and the circuit component parts 54 and also between the stem 51 and the circuit component parts 54. In use, the fuel injector is disposed in the mount hole 93 of the cylinder head E2 of the engine, so that it is exposed to a high-temperature of, for example, 140° C., which leads to a concern about the thermal breakage of the circuit component parts 54.

In order to avoid the above problem, the fuel injector of this embodiment is designed to have the resin mold 60 serving as a thermal shield to shield the circuit component parts 54 and the insulating substrate 53 thermally from the metallic injector body 4 and the metallic stem 51, thereby protecting the circuit component parts 54 from the heat transmitted from the combustion chamber E1 of the engine.

The structure of the fuel injector of this embodiment offers the following advantages.

1) The resin mold 60 functioning as a heat insulator or thermal shield is fit on the injector body 4 to minimize the transfer of thermal energy from the engine to the insulating substrate 53 (i.e., the circuit component parts 54) through the injector body 4 and the stem 51 of the fuel pressure sensor 50, thereby ensuring the accuracy in measuring a change in pressure of the fuel in the fuel supply system (including the fuel injector) which will arise from the spraying of the fuel from the fuel injector into the engine. This enables the ECU (not shown) to calculate the quantity of the fuel actually sprayed from the fuel injector, the injection timing, and the injection termination time.

2) The fuel pressure sensor 50 is made up of the stain gauge 52 and the stem 51. The stem 51 is fit in the injector body 4. The strain gauge 52 is affixed to the stem 51. The stem S1 is made independently from the injector body 4, thus permitting a loss of propagation of inner stress in the injector body 4 resulting from thermal expansion/contraction to the stem 51 to be increased. Specifically, the stem 51 is made to be separate from the injector body 4, thus reducing the adverse effects of the distortion of the injector body 4 on the stem 51 on which the strain gauge 52 is disposed as compared with when the strain gauge 52 is attached directly to the injector body 4. This results in improved accuracy in measuring a change in pressure of the fuel arising from the spraying of the fuel into the engine.

3) The stem 51 is made to be separate from the injector body 4, thus permitting it to be made of material at low costs whose coefficient of thermal expansion is small. This results in a decrease in thermal distortion of the stem 51 to ensure the accuracy of output from the stain gauge 52.

4) The stem 51 is axisymmetrical in configuration thereof, thus resulting in axisymmetrical deformation thereof when the diaphragm 51c is subjected to the pressure of the fuel, thus causing the diaphragm 51c to deform elastically as a function of the pressure of the fuel exerted thereon accurately. This ensures the accuracy in determining the pressure of the fuel.

5) The diaphragm 51c is located outside the mount recess 46 of the injector body 4, so that it will be insensitive to the thermal distortion of the injector body 4. This results in improved sensitivity of the diaphragm 51c to the pressure of the fuel supplied to the fuel injector, 6) The mount surface 51h on which the strain gauge 52 is mounted is placed flush with the insulating substrate 53 on which the circuit component parts 54 are fabricated, thus facilitating ease of bonding the strain gauge 52 electrically to the circuit component parts 54 through the wires W.

7) The installation of the stem 51 in the injector body 4 is achieved by screwing the stem 51 to establish the engagement of the external thread 51e of the stem 51 with the internal thread of the injector body 4 to urge the sealing surface 51g into constant abutment with the sealing surface 46a of the injector body 4, thereby creating the metal-touch-seal between the stem 51 and the injector body 4 to avoid the intrusion of the fuel thereinto.

8) The high-pressure path 6 in the injector body 4 has the branch path 6e which diverges from the inlet (i.e., the high-pressure paths 6b and 6c) of the injector body 4) so that the fuel hardly flows or moves within the branch path be as compared with in the high-pressure paths 6b and 6c, thereby ensuring the accuracy in measuring the pressure of the fuel through the fuel pressure sensor 50 without been affected by the flow of the fuel entering the fuel injector.

9) The branch path be diverges from the high-pressure path 6, thus causing great stress to concentrate around the intersection between the paths 6e and 6b. An increase in intersections in the injector body 4 will result in an increase in stress concentrating within the injector body 4. In order to alleviate such a drawback, the branch path 6e is formed to extend in alignment with the high-pressure path 6c diverging from the inlet of the fuel injector (i.e., the high-pressure path 6b) to minimize the intersections in the injector body 4.

10) The injector body 4 undergoes the mechanical pressure, as produced by or transmitted from the clamp K, the high- and low-pressure pipes HP and LP. Specifically, the mechanical pressure is exerted by the clamp K on the shoulder 42 of the injector body 4 to push it into the mount hole E3 of the cylinder head E2. If the high-pressure pipe HP is joined to the high-pressure port 43 in misalignment therewith, it will cause the mechanical pressure, as produced to bring the high-pressure pipe HP into alignment with the high-pressure port 43, to be exerted on the high-pressure port 43. The same is true for the low-pressure pipe LP. The exertion of such pressure on the injector body 4 will cause the internal stress to increase between a portion of the injector body 4 retained in the cylinder head E2 and the shoulder 42, the high-pressure port 43, or the low-pressure port 44 on which the pressure acts directly, which is, in turn, exerted on the fuel pressure sensor 50 undesirably. In order to alleviate this problem, the fuel pressure sensor 50 is mounted at a location opposite the cylinder head E2 across the shoulder 42, the high-pressure port 43, and the low-pressure port 44. In other words, the fuel pressure sensor 50 is away from where the internal stress increases (i.e., between the portion of the injector body 4 retained within the cylinder head E2 and the shoulder 42, the high-pressure port 43, or the low-pressure port 44), thereby minimizing the adverse effects of the internal stress on the fuel pressure sensor 50.

Figure 3:
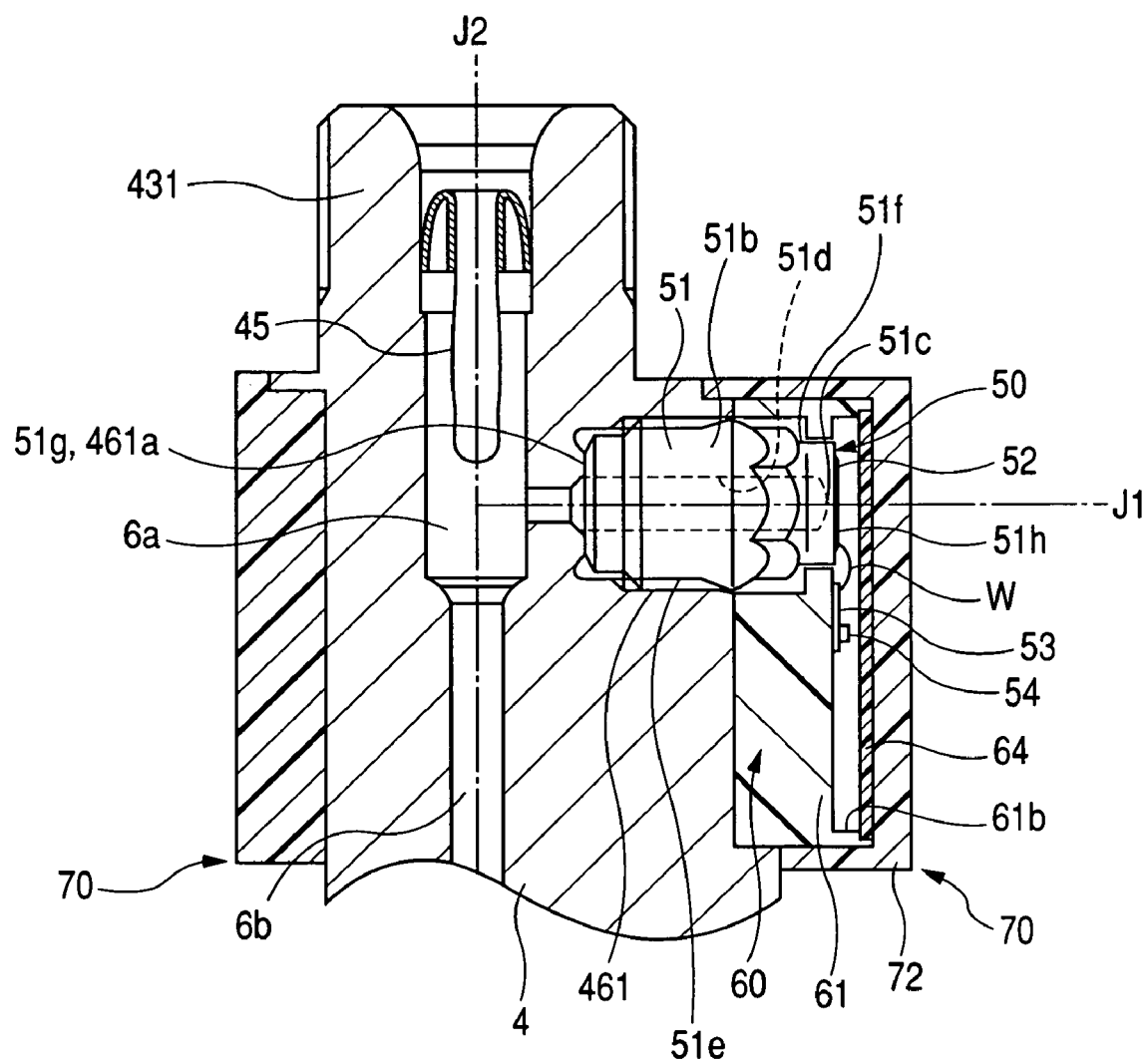
FIG. 3 is a partially longitudinal sectional view which shows an internal structure of a fuel injector according to the second embodiment of the invention.

FIG. 3 illustrates a fuel injector according to the second embodiment of the invention. The same reference numbers as used in the first embodiment will refer to the same parts, and explanation thereof in detail will be omitted here.

The fuel injector of the first embodiment is so designed that the installation of the fuel pressure sensor 50 is achieved by fitting it into the injector body 4 along the longitudinal center line J2 of the injector body 4. The fuel injector of the second embodiment is so designed that the fuel pressure sensor 50 is inserted into the injector body 4 from a radius direction of the injector body 4.

Specifically, the injector body 4 has formed in an outer circumferential wall a mount chamber 461 into which the cylindrical body 51b of the stem 51 of the fuel pressure sensor 50 is to be fitted. The injector body 4 has formed on the inner wall of the mount chamber 461 a sealing surface 461a which extends parallel to the longitudinal center line J2 of the injector body 4 and creates a hermetical metal-touch-seal between itself and the outer wall of the stem 51.

The fuel injector is also designed to have a high-pressure port 431 to which the high-pressure pipe HP is, unlike in the first embodiment, to be joined in the longitudinal center line J2. Specifically, the cylindrical injector body 4 has the high-pressure port 431 extending away from the spray hole 11 in the axial direction of the injector body 4.

The branch path 6e is, as clearly illustrated in FIG. 3, formed so as to diverge from the large-diameter path 6a which is located upstream of the small-diameter path 6b and within which the filter 45 is disposed. Specifically, the branch path 6e extends from the large-diameter path 6a substantially perpendicular thereto so that the diaphragm 51c of the fuel pressure sensor 50 is exposed to the pressure of fuel entering the fuel injector. The large-diameter path 6a functions as an accumulator to reduce the pulsation of the pressure of fuel, as having entered therein, thereby ensuring the accuracy in measuring a change in pressure of the fuel arising from the spraying thereof from the fuel injector.

In order to decrease the number of intersections between fuel flow paths in the injector body 4 which will result in an increase in stress concentrating within the injector body 4 in terms of the mechanical strength of the injector body 4, the branch path 6e may alternatively be formed to connect directly with the small-diameter path 6b.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

The fuel injector may be designed to have a combination of the features as discussed above.

The resin mode 60 may alternatively be made of rubber, ceramic material, or resin foam in order to improve the thermal resistance thereof.

The sensor terminals 55 may alternatively be disposed only in a resin mold which is separate from the resin mold 60. These two resin molds are preferably fit within the connector housing 70 in order to minimize the number of electric connectors used in the fuel injector.

The sensor output terminal 55 and the drive terminals 56 may alternatively be disposed in a holder separate from the resin mold 60.

The strain gauge 52 may alternatively be affixed directly to a portion of the injector body 4 to which the pressure of fuel supplied to the fuel injector is exposed. For instance, the portion of the injector body 4 is machined to have a thin wall so as to function as a diaphragm. The strain gauge 52 is affixed to the thin wall. The surface of the thin wall to which the strain gauge 52 is to be affixed is preferably formed flush with the insulating substrate 53 on which the circuit component parts 54 are fabricated in order to improve the efficiency of work to joining the strain gauge 52 to the circuit component parts 54.

The resin mold 60 may alternatively be disposed outside the connector housing 70. For instance, the connector housing 70 may be formed so as to partially cover or not to cover the resin mold 60.

The fuel pressure sensor 50 may alternatively be equipped with a piezoelectric device or another type of pressure sensitive device instead of the strain gauge 52.

The insulating substrate 53 and the strain gauge 52 may alternatively be arrayed to overlap each other along the longitudinal center line J1.

The fuel pressure sensor 50 may alternatively be installed in a portion of the injector body 4 which is retained inside the mount hole E3 of the cylinder head E2. The fuel pressure sensor 50 may also be installed in a portion of the injector body 4 which is closer to the spray hole 11 than the clamp K.

The invention may be used with fuel injectors designed to inject the fuel into direct injection gasoline engines as well as those for diesel engines.

What is claimed is:

1. A fuel injector for an internal combustion engine comprising:
   a metallic body in which a fuel flow path is formed which extends from a fuel inlet to a spray hole;
   an actuator disposed within said metallic body, said actuator working to open the spray hole to spray fuel, as supplied to the fuel flow path through the fuel inlet, to an internal combustion engine;
   a fuel pressure sensor installed in said metallic body, said fuel pressure sensor working to measure a pressure of the fuel in the fuel flow path and produce an electric signal indicative thereof;
   a circuit component serving as an amplifier to amplify the electric signal, as produced by said fuel pressure sensor to output the electric signal; and
   a thermal insulating member disposed between the said metallic body and the circuit component to shield said circuit component thermally, wherein said thermal insulating member has the circuit component mounted thereon and also has retained therein connector terminals leading electrically to the circuit component, and wherein said thermal insulating member, the connector terminals, and the circuit component are united as an assembly.

2. A fuel injector as set forth in claim 1, wherein said fuel pressure sensor includes a metallic deformable member and a sensing device, the metallic deformable member being secured to said metallic body to deform elastically when subjected to the pressure of the fuel, the sensing device being mounted on the metallic deformable member to produce the electric signal as a function of an amount of deformation of the metallic deformable member, and wherein said thermal insulating member is disposed between the deformable member and the circuit component.

3. A fuel injector as set forth in claim 2, wherein said thermal insulating member has formed therein a through hole extending from one of opposed surfaces thereof which faces said metallic body to the other of the opposed surfaces on which the circuit component is mounted, wherein said metallic deformable member is disposed inside the through hole, wherein the circuit component is fabricated on an insulating substrate, and wherein the thermal insulating member has formed on the other of the opposed surfaces a mount area on which the sensing device of said fuel pressure sensor is mounted and which lies flush with the insulating substrate.

4. A fuel injector as set forth in claim 1, wherein said thermal insulating member is made of one of resin, rubber, and ceramic.

\* \* \* \* \*